United States Patent

Hisamoto et al.

Patent Number: 4,695,488
Date of Patent: Sep. 22, 1987

[54] SOIL RELEASE COMPOSITION AND USE THEREOF

[75] Inventors: Iwao Hisamoto, Suita; Masaru Hirai, Settsu; Sueyoshi Ishikawa, Kishiwada, all of Japan

[73] Assignee: Daikin Industries, Ltd., Osaka, Japan

[21] Appl. No.: 835,754

[22] Filed: Mar. 3, 1986

[30] Foreign Application Priority Data

Mar. 12, 1985 [JP] Japan .................. 60-49944

[51] Int. Cl.$^4$ .................. B05D 3/02; C08L 75/00
[52] U.S. Cl. .................. 427/385.5; 252/8.8; 252/8.9; 525/125; 525/129; 525/154; 525/155; 525/160; 525/178; 525/179; 525/181; 525/183; 525/186; 525/200; 525/201; 427/379; 427/380; 427/381; 427/382; 427/383.7; 427/388.1; 427/389; 427/389.9; 427/392; 427/393.4
[58] Field of Search .................. 525/125, 129, 154, 155, 525/160, 178, 183, 200, 201, 179, 181, 186; 427/379, 380, 382, 383.7, 388.1, 389, 389.9, 392, 393.4

[56] References Cited

U.S. PATENT DOCUMENTS 3,491,169 1/1970 Raynolds et al. .................. 525/160
3,637,614 1/1972 Greenwood .................. 525/160
4,564,561 1/1986 Lore et al. .................. 428/422

Primary Examiner—Theodore E. Pertilla
Attorney, Agent, or Firm—Birch, Stewart, Kolasch & Birch

[57] ABSTRACT

A soil release composition comprising:
(A) a polymer comprising 10 to 100% by weight of constituting units of the formula:

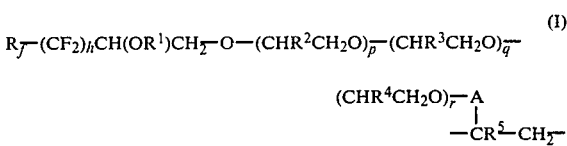

wherein $R_f$ is a $C_3$—$C_{21}$ fluoroalkyl group; $R^1$ is a hydrogen atom or a $C_2$—$C_4$ acyl group; $R^2$, $R^3$, $R^4$ and $R^5$ are, the same or different, each a hydrogen atom, a methyl group or an ethyl group; A is a group of the formula: —$CH_2CH(OR^1)CH_2$—OCO— which $R^1$ is the same as defined in the above, —CO—, —$(CH_2)_kN(R^2)CO$— in which $R^2$ is the same as defined in the above and k is an integer of 1 to 10, or —$(CH_2)_k$— in which k is the same as defined in the above; h is an integer of 0 to 5; p is an integer of 1 to 40; q and r are, the same or different, each an integer of 0 to 40,
(B) a hydrophilic resin, and
(C) optionally a water- and oil-repellent, a weight ratio of (A):(B):(C) being 5–95:95–5:0 or 1–95:5–95:1–50, which can impart stainproofing property with good durability to a substrate such as plastics, fabrics and paper.

17 Claims, No Drawings

SOIL RELEASE COMPOSITION AND USE THEREOF

FIELD OF THE INVENTION

The present invention relates to a soil release composition and a method for imparting a soil release property to a substrate.

BACKGROUND OF THE INVENTION

Plastics, fabrics, paper and the like are often treated with a soil release composition to increase their values including durability of a substrate.

Conventional soil release compositions contain silicone, hydrocarbon polymer or fluorocarbon polymer (cf. Japanese Patent Publication No. 18346/1978 and Japanese Patent Kokai Publication (unexamined) Nos. 134786/1978, 163269/1980, 129281/1981, 164181/1982, 171762/1982 and 171790/1982).

The conventional soil release composition containing silicone or the hydrocarbon polymer, however, imparts only a water absorption property and a soil release property to the substrate or alternatively only a water repellent property to the substrate. The conventional soil release composition containing the fluorine polymer only imparts a water- and oil-repellent property or an undurable soil release property to the substrate.

SUMMARY OF THE INVENTION

One object of the present invention is to provide a soil release composition which can impart a durable water absorption property and oil-repellency as well as the soil release property to a substrate.

Another object of the present invention is to provide a soil release composition which can impart durable water- and oil-repellency as well as the soil release property to a substrate.

Further object of the present invention is to provide a method for imparting a soil release property to a substrate with the soil release composition.

These and other objects are accomplished by a soil release composition according to the present invention which comprises:

(A) a polymer comprising 10 to 100% by weight of constituting units of the formula:

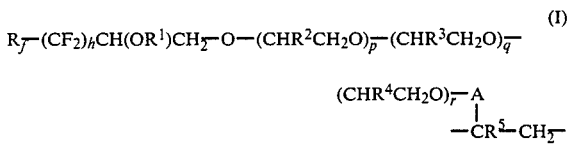
(I)

wherein $R_f$ is a $C_3$-$C_{21}$ fluoroalkyl group; $R^1$ is a hydrogen atom or a $C_2$-$C_4$ acyl group; $R^2$, $R^3$, $R^4$ and $R^5$ are, the same or different, each a hydrogen atom, a methyl group or an ethyl group; A is a group of the formula: $-CH_2CH(OR^1)CH_2-OCO-$ in which $R^1$ is the same as defined in the above, $-CO-$, $-(CH_2)_kN(R^2)CO-$ in which $R^2$ is the same as defined in the above and k is an integer of 1 to 10, or $-(CH_2)_k-$ in which k is the same as defined in the above; h is an integer of 0 to 5; p is an integer of 1 to 40; q and r are, the same or different, each an integer of 0 to 40, (B) a hydrophilic resin, and (C) optionally a water- and oil-repellent, a weight ratio of (A):(B):(C) being 5-95:95-5:0 or 1-95:5-95:1-50.

In the case where the soil release composition of the present invention comprises the polymer (A) and the hydrophilic resin (B) but not the water- and oil-repellent (C), it can impart the water absorption property and oil repellency as well as the soil release property to the substrate. In the case where the soil release composition of the present invention comprises the polymer (A), the hydrophilic resin (B) and the water- and oil-repellent (C), it can impart water- and oil-repellency as well as the soil release property to the substrate.

DETAILED DESCRIPTION OF THE INVENTION

The polymer (A) comprising the constituting unit (I) may be prepared by homopolymerizing an unsaturated monomeric compound of the formula:

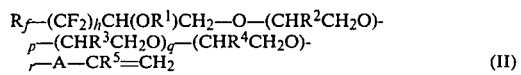
(II)

wherein $R_f$, $R^1$ to $R^5$, A, h, p, q and r are the same as defined in the above, or copolymerizing the monomer (II) with at least one of other ethylenically unsaturated monomers.

The fluoroalkyl group $R_f$ in the formulae may be a straight or branched one, and preferably the number of the fluorine atoms in the group is larger than that of the carbon atoms, more preferable the former is twice as large as the latter. The carbon chain in $R_f$ may have at least one oxygen atom between the carbon atoms.

Specific examples of the monomer (I) are
$C_5F_{11}CH_2CH(OH)CH_2O(CH_2CH_2O)_4COCH=CH_2$,
$C_7F_{15}CH_2CH(OH)CH_2O(CH_2CH_2O)_8COC(CH_3)=CH_2$,
$C_8F_{17}CH_2CH(OH)CH_2O(CH_2CH_2O)_5CH_2NHCOCH=CH_2$,
$C_8F_{17}CH_2CH(OH)CH_2O(CH_2CH_2O)_8COC(CH_3)=CH_2$,
$C_8F_{17}CH_2CH(OCOCH_3)CH_2O(CH_2CH_2O)_9COCH=CH_2$,
$C_9HF_{18}CH_2CH(OH)CH_2O(CH_2CH_2O)_{10}COC(CH_3)=CH_2$,
$C_9F_{19}CH_2CH(OH)CH_2O(CH_2CH_2O)_{13}CH_2CH=CH_2$,
$C_{10}F_{21}CH_2CH(OH)CH_2O(CH_2CH_2O)_{16}CH_2CH(OH)CH_2OCOC(CH_3)=CH_2$,
$C_{12}F_{21}CH_2CH(OCOCH_3)CH_2O(CH_2CH_2O)_{22}COC(CH_3)=CH_2$,
$C_8F_{17}CH_2CH(OCOCH_3)CH_2O(CH_2CH_2O)_{10}COCH=CH_2$,
$C_9F_{19}(CH_2)_3CH(OH)CH_2O(CH_2CH_2O)_5(CH(CH_3)CH_2O)_5COCH=CH_2$,
$C_{15}F_{31}CH_2CH(OCOCH_2CH_3)CH_2O(CH_2CH_2O)_{13}CH_2CH=CH_2$,
$C_{11}F_{23}CH_2CH(OH)CH_2O(CH_2CH_2O)_8CH_2CH_2NHCOCH=CH_2$.

Specific examples of the ethylenically unsaturated monomer to be copolymerized with the monomer (II) are vinyl chloride, vinyl acetate, styrene, α-methylstyrene, methyl vinyl ketone, acrylic or methacrylic acid or its derivative of the formula:

(III)

wherein $R^6$ is a hydrogen atom or a methyl group; $R^7$ is a hydrogen atom, a sodium atom, a potassium atom, an ammonium group, a $C_1$–$C_{18}$ alkyl group, a glycidyl group or a group of the formula: —$(CH_2CH_2O)_pR^8$ in which $R^8$ is a hydrogen atom, a $C_1$–$C_{18}$ alkyl group or a $C_2$–$C_{18}$ acyl group and p is the same as defined in the above, —$(CH_2CH_2O)_p$—$(CH_2CH(CH_3)O)_q$—$(CH_2CH_2O)_r$—$R^8$ in which $R^8$, p, q and r are the same as defined in the above or —$R^9$—OH in which $R^9$ is a $C_2$–$C_6$ alkylene group; and acryl- or methacryl-amide or its derivative of the formula:

$$CH_2=CR^6CONHR^{10} \qquad (IV)$$

wherein $R^6$ is the same as defined in the above, $R^{10}$ is a hydrogen atom or a group of the formula: —$CH_2OH$ or —$(CH_2)_p$—$N(CH_3)_2$ in which p is the same as defined in the above.

The monomer(s) can be homo- or co-polymerized by a known method described in, for example, Japanese Patent Kokai Publication (unexamined) No. 134786/1978 and the Journal of the Japanese Association of Adhesives, Vol. 17, No. 9 (1981) 371.

The hydrophilic resin includes glyoxal resin, melamine resin, polyamide resin, urethane resin, acrylic resin, triazine resin and the like. Some of the hydrophilic resins are commercially available under trade names of HW-100 (Dainippon Ink and Chemicals), Sumitex resin 901, 1000, M-3, NR-2, NS-2, W-2, AR-2 and AMH-3000 (Sumitomo Chemical), Blencope PWB-4021, PEB-4001 and PEB-4002 (Nippon Oil & Fats), Teisan urethane SL-1780 and SL-4780 (Teikoku Chemical Industries) and SR-1000 (Takamatsu Oil & Fats).

The water- and oil-repellent may be a conventionally used one and preferably a copolymer of an acrylic acid derivative of the formula:

$$R_fCH_2CH_2XCOCH=CH_2 \qquad (V)$$

wherein $R_f$ is the same as defined in the above and X is an oxygen atom or a sulphur atom, and an acrylic or methacrylic acid or its derivative of the formula:

$$CH_2=CR^6COOR^{11} \qquad (VI)$$

wherein $R^6$ is the same as defined in the above and $R^{11}$ is a hydrogen atom, a sodium atom, a potassium atom, an ammonium group or a $C_1$–$C_{18}$ alkyl group. The preparation of the copolymer of the compounds (V) and (VI) is described in, for example, Japanese Patent Publication Nos. 851/1969, 31202/1971, 42880/1972, 3438/1975, 4800/1975, 2998/1978, 11324/1982 and 9666/1984 and Japanese Patent Kokai Publication (unexamined) Nos. 132694/1979 and 11888/1983.

In the case where the soil release composition of the invention comprises the polymer (A) and the hydrophilic resin but not the water- and oil-repellent (C), the copolymer (A) comprises 10 to 100% by weight, preferably 20 to 80% by weight of the constituting unit (I) to impart sufficient oil repellency and the soil release property to the substrate. For the same reason as above, 5 to 95 parts by weight, preferably 20 to 80 parts by weight of the polymer (A) is contained in the composition. 5 to 95 parts by weight, preferably 10 to 80 parts by weight of the hydrophilic resin (B) is contained in the composition to impart the durable water absorption property and oil repellency as well as the soil release property to the substrate.

In the case where the soil release composition of the present invention comprises the polymer (A), the hydrophilic resin (B) and the water- and oil-repellent (C), the polymer (A) comprises 10 to 100% by weight, preferably 20 to 90% by weight of the constituting unit (I) to impart sufficient oil-repellency and the soil release property to the substrate. For the same reason as above, 1 to 95 parts by weight, preferably 5 to 90 parts by weight of the polymer (A) is contained in the composition. 5 to 95 parts by weight, preferably 10 to 80 parts by weight of the hydrophilic resin (B) is contained in the composition to improve the durability of water- and oil-repellency as well as of the soil release property. 1 to 50 parts by weight, preferably 20 to 40 parts by weight of the water- and oil-repellent (C) is contained in the composition to impart sufficient water- and oil-repellency as well as the soil release property to the substrate.

The soil release composition of the invention may further contain at least one additive used in the conventional soil release composition. The additive includes a catalyst which cures the hydrophilic resin (B) (e.g. zinc nitrate, magnesium chloride and the like) One of the commercially available catalyst is Sumitex accelerator (trade mark of Sumitomo Chemical).

The soil release composition of the invention may be applied to the substrate in the form of a solution, a dispersion, a suspension or an emulsion by a conventional method, for example, dip coating, spray coating, flow coating and the like. A medium in which said components are mixed includes water, acetone, ethyl acetate, tetrahydrofuran, trichlorotrifluoroethane, benzotrifluoride, hexafluoro-m-xylene, and mixtures thereof. The components of the invention are usually mixed in the medium in an amount of 0.5 to 1.0 parts by weight per 100 parts by weight of the medium.

Now, the present invention will be explained further in detail by following examples. In the examples, the soil release composition comprising the polymer (A) and the hydrophilic resin (B) but not the water- and oil-repellent (C) is examined for the properties of water absorption, oil repellency and soil release as well as their durability. The soil release composition comprising the the polymer (A), the hydrophilic resin (B) and the water- and oil-repellent (C) is examined for the properties of water-repellent, oil-repellent and soil release as well as their durability. In the examples, parts and % are by weight unless otherwise indicated.

Copolymers (A1) to (A5) and Polymers (i) to (iii) for comparison to be used in Examples and Comparative Examples were prepared in following Preparation Examples.

PREPARATION EXAMPLE 1

Preparation of Copolymer (A1)

In a four-necked 200 ml flask equipped with a thermometer, a condenser, a stirrer and an inlet for introducing nitrogen, there were added a fluorine-containing monomer mixture (14 g) of the formula:

$$CF_3CF_2(CF_2CF_2)_nCH_2CH(OH)CH_2\text{—}O\text{—}Z\text{—}COC(CH_3)=CH_2$$

in which Z is a polyethyleneoxide residue having an average molecular weight of 400 and which contains the compounds wherein n is 2, 3, 4, 5 and 6 in amounts of 3%, 55%, 28%, 12% and 3%, a methacrylate derivative (14 g) of the formula:

$$HO-Z-COC(CH_3)=CH_2$$

wherein Z is the same as defined in the above, isopropanol (112 g) and dodecylmercaptan (0.4 g), and stirred at 67° C. for 30 minutes with introducing nitrogen. Thereafter, perbutyl pivalate (0.17 g) was added to initiate the reaction and the polymerization was carried out at the same temperature for 6 hour with stirring. After removing isopropanol from the reaction mixture, the residue was washed with benzene and dried under reduced pressure to obtain Copolymer (A1).

PREPARATION EXAMPLES 2-5 AND COMPARATIVE PREPARATION EXAMPLES 1-3

Preparation of Copolymers (A2) to (A5) and Polymers (i)-(iii)

In the same manner as in Preparation Example 1 but using the following monomers, the polymerization was carried out to obtain the polymer:

Preparation Example 2 (Copolymer (A2))

The fluorine-containing monomer mixture as used in Preparation Example 1 (100 parts), the methacrylate derivative as used in Preparation Example 1 (100 parts) and $HOCH_2-NHCOCH=CH_2$ (20 parts).

Preparation Example 3 (Copolymer (A3))

The fluorine-containing monomer mixture as used in Preparation Example 1 (100 parts), styrene (300 parts) and glycidyl methacrylates (100 parts).

Preparation Example 4 (Copolymer (A4))

The fluorine-containing monomer mixture as used in Preparation Example 1 (100 parts) and $H-Y-SCH_2COOCH_2CH(OH)-CH_2OCOC(CH_3)=CH_2$ wherein Y is a polystyrene residue having an average molecular weight of 1,500 (100 parts).

Preparation Example 5

The fluorine-containing monomer mixture as used in Preparation Example 1 (100 parts), the methacrylate derivative as used in Preparatan Example 1 (80 parts) and butyl acrylate (20).

COMPARATIVE PREPARATION EXAMPLE 1 (Polymer (i))

$CF_3CF_2(CF_2CF_2)_3CH_2CH_2OCOCH=CH_2$ (100 parts), $CH_3O-W-COC(CH_3)=CH_2$ wherein W is a polyethyleneoxide residue having an average molecular weight of 660 (80 parts) and $HOCH_2NHCOCH=CH_2$ (20 parts).

COMPARATIVE PREPARATION EXAMPLE 2 (Polymer (ii))

$H[SCH_2CH(CH_3)COO(CH_2CH_2O)_4$-$COC(CH_3)CH_2]_{10}SH$ (10 parts) and $C_8H_{17}SO_2N(C_3H_7)CH_2CH_2OCOC(CH_3)=CH_2$ (60 parts).

COMPARATIVE PREPARATION EXAMPLE 3 (Polymer (iii))

$C_8H_{17}SO_2N(C_3H_7)-W-COC(CH_3)=CH_2$ (100 parts) and $CH_3O-W-COCH=CH_2$ (100 parts) wherein W is the same as defined in the above.

EXAMPLES 1-5 AND COMPARATIVE EXAMPLES 1-2

Preparation of a soil release composition

The copolymer (A) or the comparative polymer, a hydrophilic resin and other additives were added according to the following composition to 100 parts of water and stirred to prepare a soil release composition with water-absorption property and oil-repellency:

Composition

Examples 1 and 2

Copolymer (A1) (0.5 part),
Sumitex resin 901 (0.5 part) and Sumitex resin W-2 (0.5 part) (hydrophilic resins), and
zinc nitrate (0.5 part).

Example 3

Copolymer (A2) (0.5 part), and
Blencope PEB-4201 (0.5 part) (a hydrophilic resin)

Example 4

Copolymer (A3) (0.5 part), and
Sumitex resin AR-2 (0.5 part) (a hydrophilic resin).

Example 5

Copolymer (A4) (0.5 part), and
Sumitex resin AR-2 (0.5 part).

Comparative Example 1

Polymer (ii) (0.5 part),
Sumitex resin 901 (0.5 part) and Sumitex resin W-2 (0.5 part), and
zinc nitrate (0.5 part).

Comparative Example 2

Polymer (ii) (0.5 part), and
Sumitex resin AR-2 (0.5 part).

Each composition prepared in Examples 1-5 and Comparative Examples 1-2 was applied to various substrates and its water-absorption property, oil-repellency property and soil release ability as well as their durability were examined.

When the substrate was cloth, it was dipped in the composition for 5 minutes, squeezed with rollers, dried at 80° C. for 10 minutes and heated at 150° C. for 5 minutes. When the substrate was in the form of a plate, it was dipped in the composition for 5 minutes, dried at 80° C. for 10 minutes with leaning it against a wall, and then heated at 150° C. for 5 minutes.

The properties of the treated substrate were evaluated as follows:

Water-absorption property

A drop of water is dropped on the surface of the treated substrate and a time (seconds) till complete disappearance of water is confirmed by naked eyes is measured.

Oil-repellency

A drop of 4 mm in diameter of a following solvent mixture is dropped on the substrate and a critical composition of the mixture with which the drop maintains its form for three minutes is determined by naked eyes, and following point is assigned to express the oil-repellency. The larger the point, the better the oil-repellency.

| Point | Nujol (vol. %) | n-Hexane (vol. %) |
|---|---|---|
| 100 | 50 | 50 |
| 90 | 60 | 40 |
| 80 | 70 | 30 |
| 70 | 80 | 20 |
| 50 | 100 | 0 |
| 0 | (100% Nujol not retained) | |

Stainproofing test

The treated substrate was dipped in a waste motor oil for 10 hours and the surface condition was observed by naked eyes. The criteria are as follows:
1: Very bad stain remains.
2: Bad stain remains.
3: Slight stain remains.
4: Little stain remains.
5: No stain remains.

Durability

The treated substrate is washed ten times according to JIS H 103 with a detergent concentration of 2 g/l (detergent: "Super Zabu" manufactured by Kao) at 40° C. with a bath ratio of 1:40 and then subjected to the water-absorption test, the oil-repellency test and the soil release tests as described in the above.

The results are shown in Tables 1-1 to 1-3.

EXAMPLES 6-15 AND COMPARATIVE EXAMPLES 3-6

The copolymer (A) or the comparative polymer, a hydrophilic resin, a water- and oil-repellent and other additives in the following amounts were added according to the following composition to 100 parts of water and stirred to prepare a soil release composition with water-absorption property and oil-repellency:

Composition

Example 6

Copolymer (A1) (0.5 part),
Sumitex resin 901 (0.5 part) and Sumitex resin W-2 (0.5 part),
a water- and oil-repellent (A)[1)] (0.1 part), and
zinc nitrate (0.5 part).

Example 7

Copolymer (A2) (0.5 part),
Sumitex resin M-3 (0.5 part),
a water- and oil-repellent (A) (0.1 part), and
Sumitex accelerator (0.5 part).

Example 8

Copolymer (A2) (0.5 part),
Teisan urethane SL-4780 (0.5 part), and
a water- and oil-repellent (A) (0.1 part).

Example 9

Copolymer (A3) (0.5 part),
Sumitex resin M-3 (0.5 part),

TABLE 1

| | Water absorption (sec.) (Before washing/after washing) | | | | | | | | |
|---|---|---|---|---|---|---|---|---|---|
| Example No. | Nylon cloth | PET[1] cloth | PET/cotton cloth | Cotton cloth | Wool cloth | PET plate | ABS[2] plate | PMMA[3] plate | Al plate |
| 1 | 30/30 | 35/35 | 30/30 | 10/10 | 30/30 | 40/40 | 40/40 | 40/40 | 40/40 |
| 2 | 30/30 | 35/35 | 30/30 | 10/10 | 30/30 | 40/40 | 40/40 | 40/40 | 40/40 |
| 3 | 20/20 | 25/25 | 20/20 | 10/10 | 20/20 | 30/30 | 30/30 | 30/30 | 30/30 |
| 4 | 35/35 | 40/40 | 30/30 | 20/20 | 35/35 | 50/50 | 50/50 | 50/50 | 50/50 |
| 5 | 35/35 | 40/40 | 30/30 | 20/20 | 35/35 | 50/50 | 45/45 | 45/45 | 45/45 |
| Comp. 1 | Both >60 | Both >60 | Both >60 | Both >60 | Both >60 | Both >60 | Both >60 | Both >60 | Both >60 |
| Comp. 2 | Both >60 | Both >60 | Both >60 | Both >60 | Both >60 | Both >60 | Both >60 | Both >60 | Both >60 |

| | Oil-repellency (Before washing/after washing) | | | | |
|---|---|---|---|---|---|
| Example No. | PET cloth | PET/cotton cloth | Cotton cloth | PET plate | Al plate |
| 1 | 90/70 | 90/70 | 90/50 | 90/70 | 90/70 |
| 2 | 90/70 | 90/70 | 90/70 | 90/70 | 90/70 |
| 3 | 90/70 | — | 90/50 | — | — |
| 4 | — | — | — | — | 90/70 |
| 5 | — | — | — | — | 90/70 |
| Comp. 1 | 80/70 | 80/70 | 80/70 | 90/70 | 90/70 |
| Comp. 2 | 90/50 | 60/50 | 60/50 | — | — |

| | Stainproofing (Before washing) | | | | | | | | |
|---|---|---|---|---|---|---|---|---|---|
| Example No. | Nylon cloth | PET cloth | PET/cotton cloth | Cotton cloth | Wool cloth | PET plate | ABS plate | PMMA plate | Al plate |
| 1 | — | 5/5 | 5/4 | 5/4 | — | 5/5 | — | — | 5/5 |
| 2 | — | 5/5 | 5/4 | 5/4 | — | 5/5 | — | — | 5/5 |
| 3 | — | 5/4 | — | — | — | — | — | 5/5 | — |
| 4 | 5/5 | — | — | — | 5/4 | — | 5/4 | — | 5/5 |
| 5 | 5/5 | — | — | — | — | — | — | — | — |
| Comp. 1 | 3/1 | 3/1 | 4/1 | 4/1 | — | 4/1 | 4/1 | 4/1 | 4/1 |
| Comp. 2 | 2/1 | 2/1 | 2/1 | 2/1 | — | — | — | — | — |

Note:
[1]Polyethylene terephthalate.
[2]Acrylonitrile/butadiene/styrene copolymer.
[3]Polymethyl methacrylate.

a water- and oil-repellent (A) (0.1 part), and
Sumitex accelerator (0.5 part).

Example 10

Copolymer (A3) (0.5 part),
Serbifan MKP1 (0.5 part)
a water- and oil-repellent (A) (0.05 part) and a water- and oil-repellent (B)²⁾ (0.2 part), and
Serbifan KP2 (0.2 part).

Example 11

Copolymer (A4) (0.5 part),
Sumitex resin M-3 (0.5 part)
a water- and oil-repellent (A) (0.1 part), and
Sumitex accelerator (0.5 part).

Example 12

Copolymer (A4) (0.5 part),
Sumitex resin NR-2 (0.5 part),
a water- and oil-repellent (A) (0.1 part), and
zinc nitrate (0.5 part).

Example 13

Copolymer (A5) (0.5 part),
Sumitex resin (0.5 part),
a water- and oil-repellent (A) (0.2 part), and
Sumitex accelerator (0.5 part).

Example 14

Copolymer (A5) (0.5 part),
Blencope 4001 (0.5 part), and
a water- and oil-repellent (A) (0.2 part).

Example 15

Copolymer (A5) (0.5 part),
Serbifan MKP1 (0.5 part),
a water- and oil-repellent (A) (0.2 part), and
Serbifan KP2 (0.2 part).

Comparative Example 3

Polymer (i) (1.0 part),
Sumitex resin M-3 (0.5 part),
a water- and oil-repellent (A) (0.2 part), and
Sumitex accelerator (0.5 part).

Comparative Example 4

Polymer (i) (0.5 part),
Serbifan MKP1 (0.5 part)
a water- and oil-repellent (A) (0.05 part) and a water- and oil-repellent (B) (0.2 part), and
Serbifan KP2 (0.2 part).

Comparative Example 5

Polymer (iii) (0.5 part),
Sumitex resin 901 (0.5 part) and Sumitex resin W-2 (0.5 part),
a water- and oil-repellent (A) (0.1 part), and
zinc nitrate (0.5 part).

Comparative Example 6

Polymer (iii) (0.5 part),
Teisan urethane SL-4780 (0.5 part), and
a water- and oil-repellent (A) (0.1 part). Note: A water- and oil-repellent (A): A copolymer of $C_8F_{17}$—$CH_2CH_2OCOCH$=$CH_2$ and stearyl methacrylate having an average molecular weight of 25,000.
A water- and oil-repellent (B): A copolymer of $C_8F_{17}$—$CH_2CH_2SCOCH$=$CH_2$ and stearyl methacrylate having an average molecular weight of 25,000.

Each composition prepared in Examples 6-15 and Comparative Examples 3-6 was applied to various substrates and its water-repellency, oil-repellency and soil release ability as well as their durability were examined.

The composition was applied to the substrate in the same manner as in Examples 1-5.

The water-repellency was evaluated according to JIS L-1005. The oil-repellency and the soil release ability were evaluated in the same ways as in Examples 1-5. The durability of these properties was also evaluated in the same way as in Examples 1-5.

The results are shown in Tables 2-1, 2-2 and 2-3.

TABLE 2

| Example No. | Nylon cloth | PET cloth | PET/cotton cloth | Cotton cloth | Wool cloth | PET plate | ABS plate | PMMA plate | Al plate |
|---|---|---|---|---|---|---|---|---|---|
| Water-repellancy (Before washing/after washing) | | | | | | | | | |
| 6 | — | 100/100 | 90/80 | 90/80 | — | 100/100 | — | — | 100/90 |
| 7 | 100/100 | 100/100 | 100/100 | 100/90 | — | — | 100/100 | — | — |
| 8 | 100/100 | — | — | — | 100/100 | — | 100/100 | — | 100/100 |
| 9 | 100/100 | 100/100 | — | — | — | — | — | — | — |
| 10 | 90/80 | 90/80 | — | — | — | — | — | — | 90/80 |
| 11 | 100/100 | 100/100 | — | — | — | — | — | — | — |
| 12 | — | — | 100/80 | 100/90 | — | — | — | — | — |
| 13 | — | 100/100 | 100/100 | 100/100 | — | — | — | — | — |
| 14 | — | — | — | — | — | 100/100 | — | 100/100 | 100/100 |
| 15 | — | — | — | — | — | 100/100 | 100/100 | — | 100/100 |
| Comp. 3 | 90/80 | 90/80 | 90/80 | 90/80 | — | 100/90 | — | — | 100/90 |
| Comp. 4 | 100/100 | 100/100 | — | — | — | 100/100 | 100/100 | 100/100 | 100/100 |
| Comp. 5 | 80/60 | 80/60 | 80/60 | 70/60 | 80/60 | — | — | — | 100/100 |
| Comp. 6 | 80/60 | 80/60 | 80/60 | 70/60 | 80/60 | — | — | — | 100/100 |
| Oil-repellency (Before washing/after washing) | | | | | | | | | |
| 6 | — | 100/90 | 100/80 | 100/70 | — | 100/90 | — | — | 100/90 |
| 7 | 100/90 | 100/90 | 100/90 | 100/90 | — | — | 100/80 | — | — |
| 8 | 100/90 | — | — | — | 100/90 | — | 90/80 | — | 100/90 |
| 9 | 100/100 | 100/100 | — | — | — | — | — | — | — |
| 10 | 90/80 | 90/80 | — | — | — | — | — | — | 90/80 |
| 11 | 100/100 | 100/100 | — | — | — | — | — | — | — |
| 12 | — | — | 100/80 | 100/90 | — | — | — | — | — |
| 13 | — | 100/90 | 100/90 | 100/90 | — | — | — | — | — |
| 14 | — | — | — | — | — | 100/100 | — | 100/100 | 100/100 |
| 15 | — | — | — | — | — | — | 100/100 | — | 100/100 |
| Comp. 3 | 100/90 | 100/90 | 100/90 | 100/80 | — | 100/90 | — | — | 100/90 |
| Comp. 4 | 90/70 | 90/70 | — | — | — | 90/80 | 90/80 | 90/80 | 90/80 |

TABLE 2-continued

| Example No. | Nylon cloth | PET cloth | PET/cotton cloth | Cotton cloth | Wool cloth | PET plate | ABS plate | PMMA plate | Al plate |
| --- | --- | --- | --- | --- | --- | --- | --- | --- | --- |
| Comp. 5 | 90/70 | 90/70 | 80/50 | 80/50 | 80/50 | — | — | — | — |
| Comp. 6 | 90/70 | 90/70 | 80/50 | 80/50 | 80/50 | — | — | — | — |
| | | | Stainproofing (Before washing/after washing) | | | | | | |
| 6 | — | 5/5 | 5/4 | 5/3 | — | 5/5 | — | — | 5/5 |
| 7 | 5/5 | 5/5 | 5/5 | 5/5 | — | — | 5/5 | — | — |
| 8 | 5/5 | — | — | — | 5/5 | — | 5/4 | — | 5/5 |
| 9 | 5/5 | 5/5 | — | — | — | — | — | — | — |
| 10 | 5/4 | 5/4 | — | — | — | — | — | — | 5/4 |
| 11 | 5/5 | 5/5 | — | — | — | — | — | — | — |
| 12 | — | — | 5/5 | 5/5 | — | — | — | — | — |
| 13 | — | 5/5 | 5/5 | 5/5 | — | — | — | — | — |
| 14 | — | — | — | — | — | 5/5 | — | 5/5 | 5/5 |
| 15 | — | — | — | — | — | — | 5/5 | — | 5/5 |
| Comp. 3 | 2/1 | 2/1 | 2/1 | 2/1 | — | 2/1 | — | — | 2/1 |
| Comp. 4 | 2/2 | 2/2 | — | — | — | 2/2 | 2/2 | 2/2 | 2/2 |
| Comp. 5 | 4/1 | 4/1 | 4/1 | 4/1 | 4/1 | — | — | — | — |
| Comp. 6 | 4/2 | 4/2 | 4/2 | 4/2 | 4/2 | — | — | — | — |

What is claimed is:

1. A soil release composition comprising:

(A) a polymer containing 10 to 100% by weight of constituting unit of the formula:

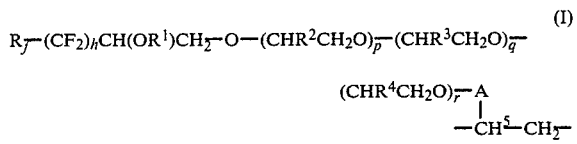

wherein $R_f$ is a $C_3$-$C_{21}$ fluoroalkyl group; $R^1$ is a hydrogen atom or a $C_2$-$C_4$ acyl group; $R^2$, $R^3$, $R^4$ and $R^5$ are, the same or different, each a hydrogen atom, a methyl group or an ethyl group; A is a group of the formula: —$CH_2CH(OR^1)CH_2$—OCO— in which $R^1$ is the same as defined in the above, —CO—, —$(CH_2)_kN(R^2)CO$— in which $R^2$ is the same as defined in the above and k is an integer of 1 to 10, or —$(CH_2)_k$— in which k is the same as defined in the above; h is an integer of 0 to 5; p is an integer of 1 to 40; q and r are, the same or different, each an integer of 0 to 40, (B) at least one hydrophilic resin selected from the group consisting of glyoxal resin, melamine resin, polyamide resin, urethane resin, acrylic resin and triazine resin, and (C) a water- and oil-repellent, the weight ratio of (A):(B):(C) being 5-95:95-5:0 or 1-95:5-95:1-50.

2. The soil release composition according to claim 1, which comprises 5 to 95 parts by weight of the polymer (A) and 95 to 5 parts by weight of the hydrophilic resin (B).

3. The soil release composition according to claim 2, wherein the polymer (A) comprises 20 to 80% by weight of the constituting units (I).

4. The soil release composition according to claim 2, wherein the weight ratio of the polymer (A) and the hydrophilic resin (B) is 5-80:95-20.

5. The soil release composition according to claim 2, wherein the weight ratio of the polymer (A) and the hydrophilic resin (B) is 20-90:80-10.

6. The soil release composition according to claim 1, which comprises 1 to 95 parts by weight of the polymer (A), 5 to 95 parts by weight of the hydrophilic resin (B) and 1 to 50 parts by weight of the water- and oil-repellent (C).

7. The soil release composition according to claim 6, wherein the polymer (A) comprises 20 to 90% by weight of the constituting unit (I).

8. The soil release composition according to claim 7, which comprises 5 to 90 parts by weight of the polymer (A), 10 to 80 parts by weight of the hydrophilic resin (B) and 20 to 40 parts by weight of the water- and oil-repellent (C).

9. The soil release composition according to claim 1, wherein the number of the fluorine atoms of the group $R_f$ is at least twice as large as the carbon atoms of said group.

10. The soil release composition according to claim 1, wherein the polymer (A) is a homopolymer of the constituting unit (I).

11. The soil release composition according to claim 1, wherein the polymer (A) is a copolymer comprising the constituting units (I) and constituting units of at least one comonomer selected from the group consisting of vinyl chloride, vinyl acetate, styrene, α-methylstyrene, methyl vinyl ketone, acrylic or methacrylic acid or its derivative of the formula:

wherein $R^6$ is a hydrogen atom or a methyl group; $R^7$ is a hydrogen atom, a sodium atom, a potassium atom, an ammonium group, a $C_1$-$C_{18}$ alkyl group, a glycidyl group or a group of the formula: —$(CH_2CH_2O)_pR^8$ in which $R^8$ is a hydrogen atom, a $C_1$-$C_{18}$ alkyl group or a $C_2$-$C_{18}$ acyl group and p is the same as defined in the above, —$(CH_2CH_2O)_p$—$(CH_2CH(CH_3)O)_q$—$(CH_2CH_2O)_r$—$R^8$ in which $R^8$, p, q and r are the same as defined in the above or —$R^9$—OH in which $R^9$ is a $C_2$-$C_6$ alkylene group; and acryl- or methacryl-amide or its derivative of the formula:

wherein $R^6$ is the same as defined in the above, $R^{10}$ is a hydrogen atom or a group of the formula: —$CH_2OH$ or —$(CH_2)_p$—$N(CH_3)_2$ in which p is the same as defined in the above.

12. The soil release composition according to claim 6, wherein the water- and oil-repellent (C) is a copolymer of an acrylic acid derivative of the formula:

wherein $R_f$ is the same as defined in the above and X is an oxygen atom or a sulphur atom, and an acrylic or methacrylic acid or its derivative of the formula:

$$CH_2=CR^6COOR^{11} \quad (VI)$$

wherein $R^6$ is the same as defined in the above and $R^{11}$ is a hydrogen atom, a sodium atom, a potassium atom, an ammonium group or a $C_1$–$C_{18}$ alkyl group.

13. A method for imparting a soil release property to a substrate comprising applying, a soil release composition of claim 1 mixed in a liquid medium, to the substrate and removing the liquid medium from the substrate.

14. The soil release composition according to claim 1, which further comprises a catalyst which is capable of curing the hydrophilic resin (B).

15. The soil release composition according to claim 14, wherein the catalyst is zinc nitrate or magnesium chloride.

16. The method for imparting a soil release property to a substrate according to claim 13, wherein the liquid medium is selected from the group consisting of water, acetone, ethyl acetate, tetrahydrofuran, trichlorotrifluoroethane, benzotrifluoride, hexafluoro-m-xylene and mixtures thereof.

17. The method for imparting soil release property to a substrate according to claim 16, wherein the soil release composition is mixed in the liquid medium in an amount of 0.5 to 1.0 parts by weight per 100 parts by weight of the medium.

* * * * *